(12) United States Patent
Simonsson et al.

(10) Patent No.: US 6,826,410 B2
(45) Date of Patent: Nov. 30, 2004

(54) METHOD AND APPARATUS RELATING TO RADIO COMMUNICATION

(75) Inventors: Arne Simonsson, Gammelstad (SE); Mikael Strömsoe, Hagersten (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 532 days.

(21) Appl. No.: 09/749,920

(22) Filed: Dec. 29, 2000

(65) Prior Publication Data

US 2001/0041537 A1 Nov. 15, 2001

(30) Foreign Application Priority Data

Dec. 30, 1999 (SE) ............................................. 9904859

(51) Int. Cl.[7] ..................... H04B 17/00; H04B 15/00; H04Q 7/20

(52) U.S. Cl. .................. 455/506; 455/67.11; 455/65; 455/436; 455/437; 455/438; 455/439; 455/504

(58) Field of Search ................................ 455/504, 506, 455/65, 436, 437, 438, 439, 67.11

(56) References Cited

U.S. PATENT DOCUMENTS 4,752,967 A  6/1988  Bustamante et al.
5,625,875 A  * 4/1997  Whinnett et al. ........... 455/513
5,898,928 A  4/1999  Karlsson et al.
6,434,130 B1 * 8/2002  Soininen et al. ............ 370/331

FOREIGN PATENT DOCUMENTS

| EP | 0755130 | 1/1997 |
| GB | 2237706 | 5/1991 |
| GB | 2288949 | 11/1995 |
| WO | WO98/35525 | 8/1998 |
| WO | WO99/44384 | 9/1999 |

* cited by examiner

Primary Examiner—Lee Nguyen
Assistant Examiner—Yuwen Pan

(57) ABSTRACT

The present invention pertains to the field of methods and apparatuses relating to radio communication; and in particular to the part of this field that concerns cellular radio communication. The present invention addresses mainly the problem of improving reliability and communication quality in a cellular radio communication system (1). According to the invention, it is determined whether one of an uplink (25) or a downlink (25) of a radio channel (23) is subject to a Rayleigh fading dip. If it is determined that one of the uplink (25) or the downlink (27) is subject to a Rayleigh fading dip, it is then determined whether it is necessary to execute a countermeasure in order to avoid the negative influences of Rayleigh fading on the channel (23). The invention is not limited to improving conditions on one channel but may be employed to any number of channels used for communications in the cellular radio communication system (1).

58 Claims, 5 Drawing Sheets

METHOD AND APPARATUS RELATING TO RADIO COMMUNICATION

TECHNICAL FIELD

The present invention pertains to the field of methods and apparatuses relating to radio communication; and in particular to the part of this field that concerns cellular radio communication.

BACKGROUND AND RELATED ART

A conventional public land mobile telephone network (PLMN)—i.e. cellular radio communication system—include a land system and one or more radio terminals, e.g. mobile (or fixed) cellular radio phones, cellular communicators or computers having associated cellular radio communication equipment. The land system typically includes a switching system, which is connected to one or more radio communication nodes, commonly referred to as radio base stations (RBS). The switching system includes one or more switching nodes, for example mobile services switching centres (MSC), which are arranged for providing the necessary switching functions in order for information (e.g. coded speech or data) to be transferred in a desired manner between the radio base stations. The switching system includes registers containing, among other things, information relating to subscriptions in the PLMN. The switching system normally includes also one or more gateway nodes for connecting the PLMN to other communication networks, e.g. public switched telephone networks (PSTN), data networks, Internet et cetera. Each radio base station serves at least one geographical area known as a cell. The radio base stations are arranged for providing radio communication services (e.g. speech communication or data communication) to radio terminals that are within the cell(s). The radio terminals communicate with the radio base stations via a predetermined radio interface. The land system is arranged for allowing radio terminals to communicate, via the radio base stations and the switching system, with, for example, other radio terminals in the PLMN, with telephones connected to a PSTN or with computers connected to a data network or internet.

In order to organise radio channels for the radio communications between the radio terminals and the radio base stations, a number of multiple access methods have been developed. Today the most widely used access methods are FDMA (Frequency Division Multiple Access), TDMA (Time Division Multiple Access) and CDMA (Code Division Multiple Access).

In FDMA, an available radio frequency range is divided into a number of (narrow) separated frequency bands. During FDMA communications between a radio terminal and a radio base station, a selected first frequency band is used for uplink communication (radio terminal to radio base station) and a selected second frequency band is used for downlink communication (radio base station to radio terminal). The first frequency band and the second frequency band are dedicated for the communication between the radio terminal and the radio base station and are not at the same time used for communications between the radio base station and other radio terminals in the cell(s) associated with the radio base station. FDMA is used foremost in older analogue PLMN systems, for example in the NMT system (Nordic Mobile Telephone system) and in the AMPS system (Advanced Mobile Phone System).

In TDMA, an available frequency range is normally also divided into a number of separated frequency bands. During TDMA communications between a radio terminal and a radio base station, a selected first frequency band is used for uplink communication and a selected second frequency band is used for downlink communication. However, the radio terminal is not allowed to use the first frequency band for uplink communication all the time, but only during predetermined time intervals—so called time slots. In a similar way, the radio base station is only allowed to use certain time slots for the downlink communication with the radio terminal. The remaining time slots of the first frequency band and the second frequency band are available for uplink and downlink communication between the radio base station and other radio terminals in the cell(s) associated with the radio base station. TDMA is used in several digital PLMN, for example the GSM system (Global System for Mobile communications) and the D-AMPS system (Digital-AMPS (TDMA)).

The CDMA methods are somewhat more complicated than FDMA and TDMA. However, a common feature of the CDMA methods is that transmitted radio signals have a frequency bandwidth which is large in comparison with the bandwidth of the information that is transferred by the radio signals (band spread signals). The most common CDMA methods are frequency hopping CDMA and DS (Direct Sequence) CDMA. For example, the TIA (Telecommunications Industry Association) interim standard IS-95 makes use of DS access.

In the PLMN, ongoing communications between the radio terminals and the radio base stations must not be unintentionally lost, and the communication quality must be acceptable to users of the radio terminals. However, there are several known transmission problems that may cause communications to be lost and communication quality to be degraded. Some of the main transmission problems are path loss (i.e. a decreased signal strength due to an increased distance between the radio terminal and the radio base station), interference from other radio transmissions and Rayleigh fading (i.e. decreased signal strength due to destructive interference caused by multipath propagation of radio signals).

The normal remedy for path loss is to perform an inter-cell handoff, i.e. a change of channel from the channel associated with the radio base station via which the radio terminal is currently communicating to a second channel associated with a new radio base station which is closer to the radio terminal.

When interference is present, the received signal strength (on up- and/or downlink) is normally not low but the communication quality is nevertheless poor, e.g. the bit error rate (BER) and/or frame erasure rate (FER) are high. Inter-cell handoff is therefore not a suitable remedy, since low signal strength is not the problem. The normal remedy is instead a change of channel from the currently used channel to new channel associated with the same radio base station but using different frequencies than the currently used channel. Such a change of channel is commonly referred to as an intra-cell handoff.

The PLMNs has been used foremost with moving radio terminals, such as mobile cellular radio phones. Rayleigh fading has therefore not been considered a severe transmission problem, since signal loss due to Rayleigh fading only occurs for fairly short periods of time, which normally does not jeopardise the communication quality to any great extent.

SUMMARY OF THE INVENTION

The present invention addresses mainly the problem of improving reliability and communication quality in a cellular radio communication system.

According to the present invention it is observed that today it is becoming more common to have stationary or slowly moving radio terminals. For example, the use of computers having associated cellular radio communication equipment and stationary cellular phones (e.g. in communication units in dispense or slot machines and the like) is becoming more frequent. For stationary and slow moving radio terminals Rayleigh fading is more likely to cause the loss of communications or severely degraded communication quality, especially in FDMA and TDMA systems. Rayleigh fading influences CDMA systems negatively to a lesser degree than FDMA and TDMA systems. However, in indoor environments the coherence bandwidth is normally large, and Rayleigh fading may therefore influence also band spread signals negatively to a non-negligible extent.

The problem stated above is therefore solved in short by taking into account the negative influences of Rayleigh fading and actively responding in an appropriate manner to such influences.

A main object of the invention is thus to improve reliability and communication quality in cellular radio communication systems, and the invention includes methods as well as apparatuses for achieving this object.

The problem stated above is solved in somewhat more detail according to the following. It is determined whether one of an uplink or a downlink of a radio channel is subject to a Rayleigh fading dip. If it is determined that one of the uplink or the downlink is subject to a Rayleigh fading dip, it is then determined whether it is necessary to execute a countermeasure in order to avoid the negative influences of Rayleigh fading on the channel. The invention is naturally not limited to improving conditions on one channel but may be employed to any number of channels used for communications in a PLMN.

In addition to solving the above-stated problem, the invention has the advantage that it provides a more optimal usage of available channel resources, thereby increasing the coverage of the cellular radio communication system.

The invention will now be described further using preferred embodiments and referring to the drawings.

PREFERRED EMBODIMENTS

Figure 1:
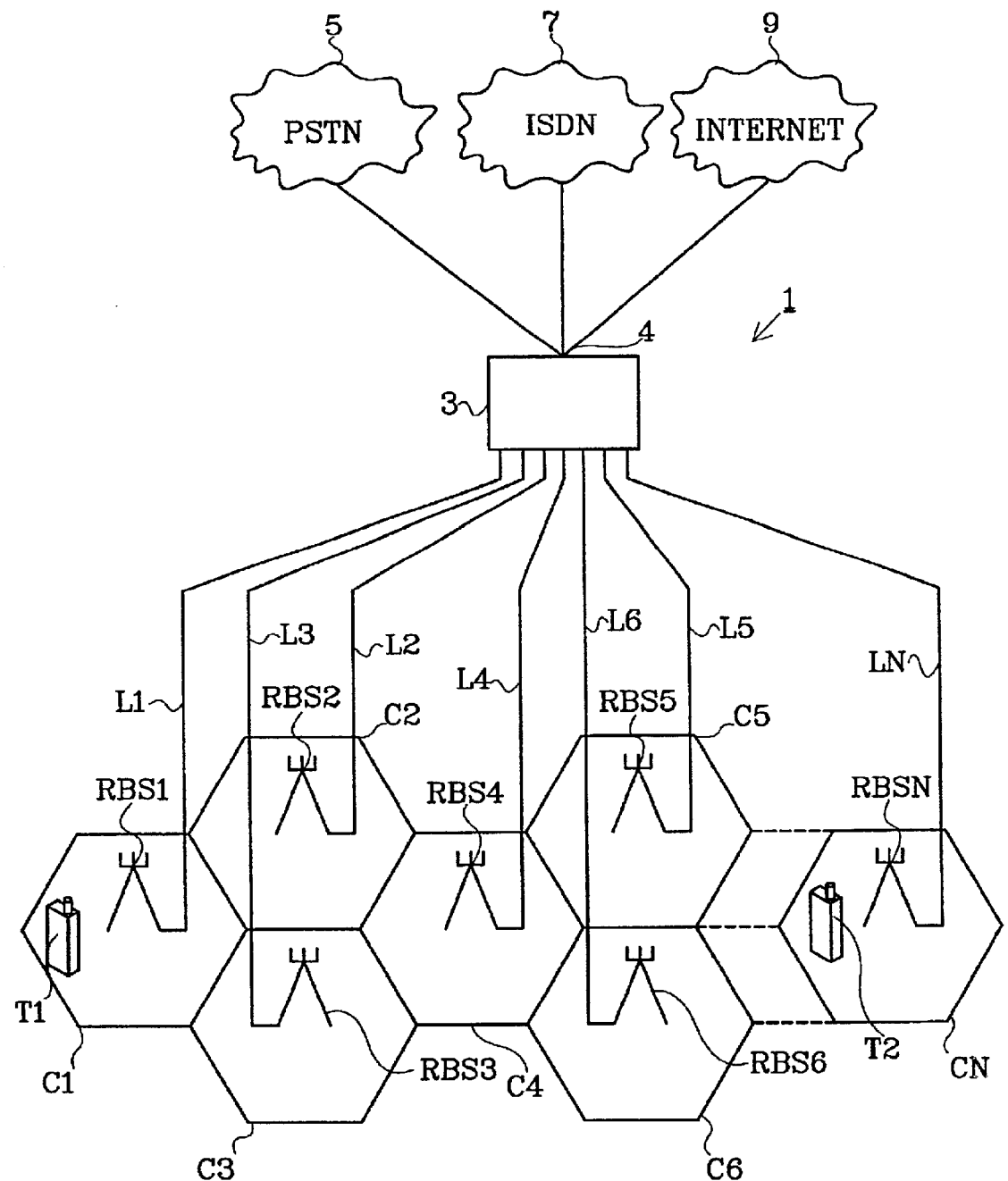
FIG. 1 is a block diagram describing a PLMN.

FIG. 1 is a block diagram describing a PLMN 1 comprising a land system having a switching system 3 and a number (N) of radio base stations RBS1-RBSN. In this example the radio base stations RBS1-RBSN are arranged for providing radio communication services (e.g. speech communication or data communication) in corresponding cells C1-CN. The radio base stations RBS1-RBSN are connected to the switching system 3 by means of communication links L1-LN. In this example, the communication links L1-LN are landline connections. Alternatively, however, the communication links L1-LN are provided in some other form, e.g. in the form of radio links. The switching system includes a gateway node 4, which connects the PLMN 1 to other networks—in this example a PSTN 5, an ISDN 7 (Integrated Services Digital Network) and Internet 9. Radio terminals have subscriptions registered in the switching system 3. By way of example, a first radio terminal T1 is currently present in the cell C1 associated with the first radio base station RBS1, and a second radio terminal T2 is present in the cell CN associated with the Nth radio base station RBSN.

The first radio terminal T1 may communicate for example with the second radio terminal T2 via the first radio base station RBS1, the switching system 3 and the Nth radio base station RBSN. The first radio terminal T1 may also communicate with fixed phones (not shown) connected to the PSTN 5 or devices (not shown) connected to the ISDN 7 or Internet 9 via the first radio base station RBS1, the switching system 3 and the gateway node 4.

Figure 2:
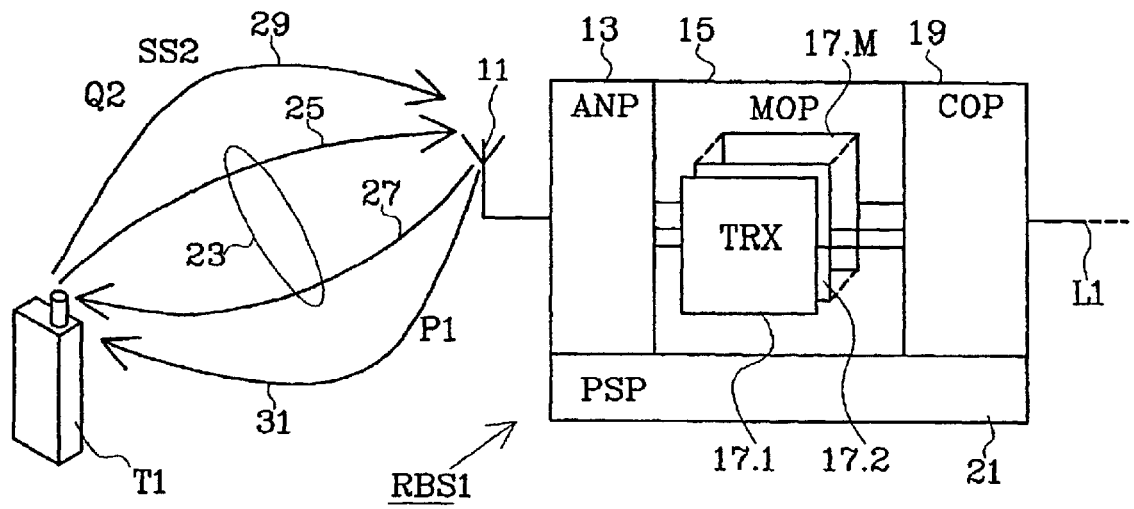
FIG. 2 is a block diagram describing a first radio terminal and a first radio base station in the PLMN.

FIG. 2 is a block diagram describing the first radio base station RBS1 and the first radio terminal T1 in more detail. The first radio base station RBS1 includes an antenna unit 11 and an antenna near part 13 which is arranged for connecting the antenna unit 11 to a modem part 15 of the first radio base station RBS1. The modem part 15 includes a number (M) of transceivers 17.1–17.M. The first radio base station RBS1 includes also a control part 19 and a power supply part 21. The control part 19 is arranged for controlling the operation of the first radio base station RBS1 and for connecting the first radio base station RBS1 to the communication link L1. The construction and function of the different parts of the first radio base station RBS1 are well known to persons skilled in the art and will not be described in further detail.

In FIG. 2, communication between the first radio terminal T1 and the first radio base station RBS1 is currently taking place over a first (duplex) channel 23 having an uplink 25 and a downlink 27. A first carrier frequency f1 is used for the uplink 25, and a second carrier frequency f2 is used for the downlink 27. The first carrier frequency f1 is separated from the second carrier frequency f2 by a predetermined duplex distance. The first terminal T1 is arranged for continuously monitoring the received downlink signal strength SS2 and for continuously generating an estimate Q2 of the communication quality on the downlink 27. The first radio terminal T1 is also arranged for sending information concerning the signal strength SS2 of the downlink and the quality estimate Q2 to the first radio base station RBS1, e.g. over a control channel uplink 29. Furthermore, the first radio terminal T1 is arranged for receiving control information, such as power control orders, from the first radio base station RBS1, e.g. over a control channel downlink 31.

Radio signals that are sent over the downlink 27 from the first radio base station RBS1 will usually reach the first radio terminal T1 along more than one path due to reflections against objects, e.g. cars or buildings, in the surroundings. At the first terminal T1, signals that have travelled along different paths will superimpose. If the signals superimpose destructively, a decrease in received downlink signal strength SS2 will occur. This phenomenon is commonly known as Rayleigh fading. The degree of Rayleigh fading will vary depending on the position of the first radio terminal T1 and variations in the reflective surroundings. If the first radio terminal T1 is moving, low downlink signal strength SS2 due to Rayleigh fading will usually exist for relatively short periods of time, and the communication quality of the downlink will normally not be severely influenced. On the other hand, if the first radio terminal T1 is stationary or only slowly moving, Rayleigh fading may exist for longer periods of time, and the downlink communication quality may be severely degraded or the communications may be lost. In a similar way, Rayleigh fading will also effect the communications over the uplink 25. However, since the carrier frequency f1 of the uplink 25 is different from the carrier frequency f2 of the downlink 27, low uplink signal strength SS1 and low downlink signal strength SS2, due to Rayleigh fading, are not likely be present at the same time.

Figure 3:
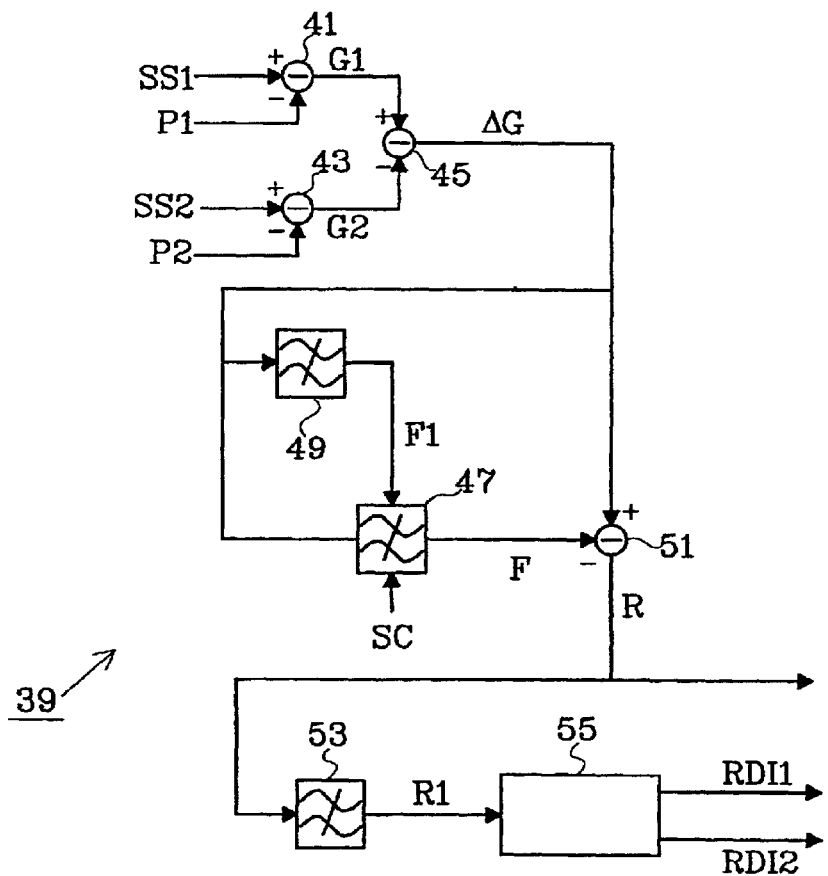
FIG. 3 is a block diagram describing a system for determining whether one of an uplink or a downlink of a channel associated with the first radio base station is subject to a Rayleigh fading dip.

FIG. 3 is a block diagram describing, as an example according to the present invention, a system 39 for determining whether one of the uplink 25 or the downlink 27 is subject to a Rayleigh fading dip, i.e. a particularly low uplink or downlink signal strength SS1 or SS2, which is due to Rayleigh fading. The system 39 is preferably arranged in the control part 19 of the first radio base station RBS1. Alternatively, however, the system 39 is arranged in some other part of the first radio base station RBS1 or at a location separate from the first radio base station RBS1.

The system 39 comprises a first differentiator 41, which is arranged for receiving a signal indicative of a measurement of the uplink signal strength SS1 and a signal indicative of an estimate of a transmitted uplink power P1. The first differentiator 41 is arranged for generating an uplink gain GI by subtracting the estimated transmitted uplink power P1 from the uplink signal strength SS1 (G1=SS1−P1). The system 39 comprises also a second differentiator 43, which is arranged for receiving a signal indicative of a measurement of the downlink signal strength SS2 and a signal indicative of an estimate of a transmitted downlink power P2. The second differentiator 43 is arranged for generating a downlink gain G2 by subtracting the estimated transmitted downlink power P2 from the downlink signal strength SS2 (G2=SS2−P2). The system 39 comprises further a third differentiator 45, which is connected to the first and the second differentiator 41 and 43 and arranged for receiving the uplink and downlink gains GI and G2. The third differentiator 45 is arranged for generating a gain difference ΔG by subtracting the downlink gain G2 from the uplink gain G1 (ΔG=G1−G2).

The gain difference ΔG consists of two parts: a constant offset F and a varying Rayleigh difference R (ΔG=F+R). The offset F accounts for a constant difference between the uplink and the downlink gain G1 and G2. The offset F is determined by several factors, such as the use of antenna diversity on the uplink 25, equipment differences (e.g. different equipments or methods for measuring uplink and downlink signal strength SS1 and SS2 and/or for estimating transmitted uplink or downlink power P1 and P2), differences in antenna quality, combiner loss et cetera. The Rayleigh difference R varies, and the variations of the Rayleigh difference R depend mainly on the degree of Rayleigh fading influencing the uplink 25 and the downlink 27.

The system 39 comprises a first averaging filter 47, which is connected to the third differentiator 45 and arranged for receiving the gain difference ΔG. The first averaging filter 47 is arranged for generating the offset F by averaging the gain difference ΔG over a communication segment, i.e. a period of time during which communications between the first radio terminal T1 and the first radio base station RBS1 take place over the channel 23. The first averaging filter 47 is arranged for receiving, from the control part 19, a control signal SC. The control signal SC indicates to the first averaging filter 47 when the communication segment starts and ends. The system 39 further comprises a second averaging filter 49. The second averaging filter 49 is also arranged for receiving the gain difference ΔG. The second averaging filter 49 is arranged for generating a channel offset F1 by averaging the gain difference ΔG associated with the channel 23 for all communications performed over the channel 23 from a selected point in time which precedes the current communication segment. The channel offset F1 indicates a part of the offset F which depends mainly on the equipment, of the first radio base station RBS1, which is responsible for communications over the channel 23. The first averaging filter 47 is connected to the second averaging filter 49 and arranged for receiving the channel offset F1. The channel offset F1 is used in the first averaging filter 47 for initiating the averaging of the gain difference ΔG in order to reduce a convergence time of the averaging performed by the first averaging filter 47. However, as an alternative, the second averaging filter 49 may be left out. In yet another alternative, the second averaging filter 49 is instead arranged for averaging the gain difference ΔG during communications performed over the channel 23 between the first radio base station RBS1 and radio terminals of the same type as the first radio terminal T1. This will produce a radio terminal type offset F11. The radio terminal type offset F11 indicates a part of the offset F which depends on similarities between radio terminals of the same type as the first radio terminal T1. The radio terminal type offset is used, in a similar way as the channel offset F1, for initiating the first averaging filter 47 in order to reduce the convergence time.

The system 39 further comprises a fourth differentiator 51, which is connected to the first averaging filter 47 and the third differentiator 45 and arranged for receiving the offset F and the gain difference ΔG. The fourth differentiator 51 is arranged for generating the Rayleigh difference R by subtracting the offset F from the gain difference ΔG.

The system 39 comprises means for determining whether one of the uplink 25 or the downlink 27 is subject to a Rayleigh fading dip by monitoring the Rayleigh difference R. The system 39 comprises a first low-pass filter 53, which is connected to the fourth differentiator 51 and arranged for receiving the Rayleigh difference R. The first low-pass filter 53 is arranged for generating a low-pass signal R1 by performing a low-pass filtering of the Rayleigh difference R. The first low-pass filter 53 is arranged for suppressing fast changes in the Rayleigh difference R. The low-pass signal R1 therefore reflects characteristics in the Rayleigh difference R that are of a more persistent nature. Filter parameters of the first low-pass filter 53 are preferably selected in order to suppress characteristics of the Rayleigh difference R that exist only for periods of time which are so short that Rayleigh fading during these periods of time would have a negligible effect on the communication quality of the channel 23.

The system 39 further comprises an evaluator unit 55, which is connected to the first low-pass filter 53 and arranged for receiving the low-pass signal R1. Alternatively, however, the first low-pass filter 53 may be left out, and the evaluator unit 55 instead being arranged for receiving the Rayleigh difference R directly. The evaluator unit 55 is arranged for generating in dependence of the low-pass signal R1 (or alternatively R) a first and a second Rayleigh fading dip indicator RDI1 and RDI2. The RDI1 indicates whether or not the uplink 25 is subject to a Rayleigh fading dip. The RDI2 indicates, in a similar way, whether or not the downlink 27 is subject to a Rayleigh fading dip. The evaluator unit 55 is arranged for comparing the low-pass signal R1 (or alternatively R) with a first (positive) threshold value v1 and a second (negative) threshold value v2. Preferably, the threshold values v1 and v2 are symmetrical, i.e. v1=−v2. The first threshold value v1 is preferably selected in the range from 3 dB to 10 dB and in particular the first threshold value is selected around 6 dB. The second threshold value is selected in a corresponding manner. If the low-pass signal R1 (or alternatively R) is greater than the first threshold value v1, then the evaluator unit 55 is arranged for generating the RDI2 to be one (1) (i.e. generating the RDI2 to exhibit a predetermined signal characteristic representing the digit 1)—the RDI2 thereby indicating that the downlink 27 is subject to a Rayleigh fading dip. Otherwise, the evaluator unit 55 is arranged for generating the RDI2 to be zero (0) (i.e. generating the RDI2 to exhibit a predetermined signal characteristic representing the digit 0)—the RDI2 thereby indicating that the downlink 27 is not subject to a Rayleigh fading dip. If the low-pass signal R1 (or alternatively R) is less than the second threshold value v2, then the evaluator unit is arranged for generating the RDI1 to be one (1)—the RDI1 thereby indicating that the uplink 25 is subject to a Rayleigh fading dip. Otherwise, the evaluator unit 55 is arranged for generating the RDI1 to be zero (0)—the RDI1 thereby indicating that the uplink 25 is not subject to a Rayleigh fading dip.

The system 39 may, for example, be built with electrical components that are arranged on one or more circuit boards and/or on one or more integrated circuit units. The skilled person will appreciate that the functions performed by the system 39 may also be performed with a computer being programmed with appropriate software and having suitable signal inputs and outputs, or with a computer in combination with additional hardware components.

The invention includes also a method, by which the system 39 operates, the method including method steps for carrying out the functions of the system 39, said method steps being readily apparent to a skilled person from the above.

Once it has been determined by the system 39 that one of the uplink 25 or the downlink 27 is subject to a Rayleigh fading dip, the PLMN 1 is arranged for determining whether a handoff from the channel 23 is to be performed in order to improve communication quality and reliability with respect to communication services provided to the first radio terminal T1 by the PLMN 1.

Figure 4:
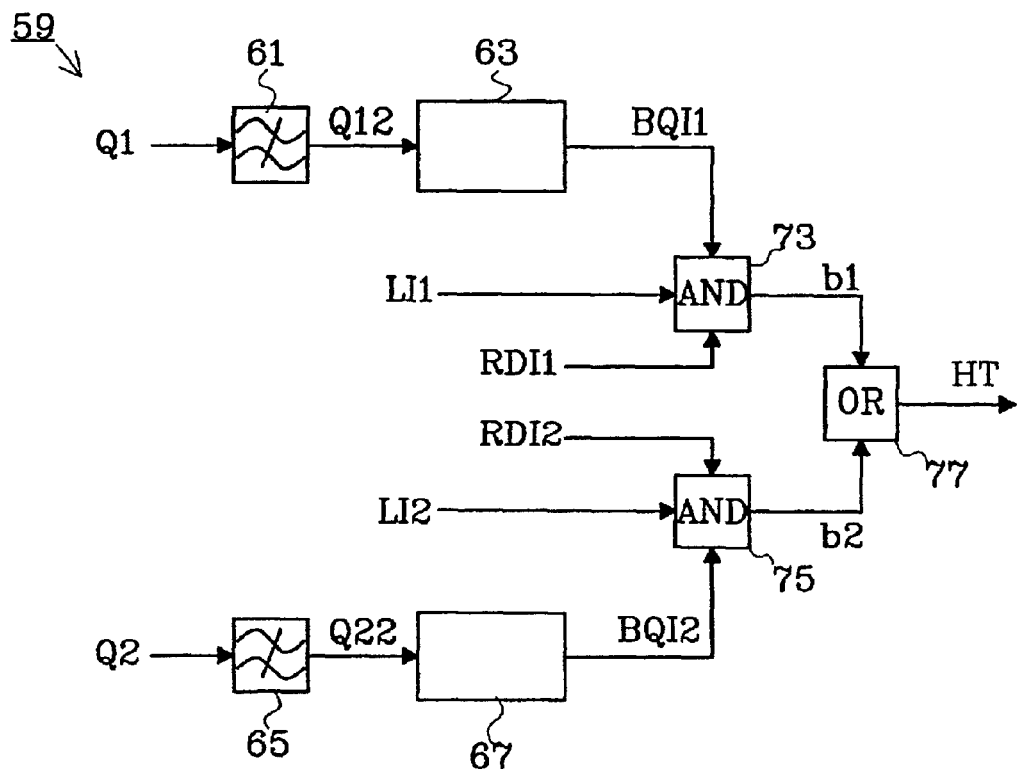
FIG. 4 is a block diagram describing a system for determining whether to perform a handoff from the channel associated with the first radio base station.

FIG. 4 is a block diagram describing a system 59 for determining whether to perform a handoff from the channel 23. The system 59 is preferably arranged in the control part 19 of the first radio base station RBS1. Alternatively, however, the system 59 is arranged in some other part of the first radio base station RBS1 or at a location separate from the first radio base station RBS1.

The system 59 comprises a first low-pass filter 61, which is arranged for receiving an estimate Q1 of the communication quality of the uplink 25. The first low-pass filter 61 is arranged for generating a first filtered estimate Q12 by low-pass filtering the estimate Q1. The system 59 comprises a first evaluator unit 63, which is connected to the first filter 61 and arranged for receiving the first filtered estimate Q12. The first evaluator unit 63 is arranged for determining whether the quality of the uplink 25 is acceptable or not and for generating a first bad quality indicator BQI1 indicating whether the quality of the uplink 25 is bad (i.e. not acceptable) or acceptable. The system 59 comprises also a second low-pass filter 65, which is arranged for receiving the estimate Q2 of the communication quality of the downlink 27. The second low-pass filter 65 is arranged for generating a second filtered estimate Q22 by low-pass filtering the estimate Q2. The system 59 comprises also a second evaluator unit 67, which is connected to the second filter 65 and arranged for receiving the second filtered estimate Q22. The second evaluator unit 67 is arranged for determining whether the quality of the downlink 27 is acceptable or not and for generating a second bad quality indicator BQI2 indicating whether the quality of the downlink 27 is bad (i.e. not acceptable) or acceptable.

The estimates Q1 and Q2 are, for the digital case, preferably measurements of the bit error rates (BER) associated with the uplink 25 and the downlink 27. Alternatively, however, the estimates Q1 and Q2 are instead measurements of the frame erasure rates (FER) associated with the uplink 25 and the downlink 27 or combinations of measurements of BER and FER associated with the uplink 25 and the downlink 27, or something else. For the analogue case, the estimates Q1 and Q2 are preferably measurements of SINAD (SIgnal to Noise And Distortion) associated with the uplink 25 and the downlink 27. The first evaluator unit 63 is arranged for determining that the quality of the uplink 25 is acceptable if the first filtered estimate Q12 is smaller than or equal to a first quality threshold value QT1 and for determining that the quality of the uplink 25 is not acceptable if the first filtered estimate Q12 is greater than the first quality threshold value QT1. The second evaluator unit 67 is, in a similar way, arranged for determining that the quality of the downlink 27 is acceptable if the second filtered estimate Q22 is smaller than or equal to a second quality threshold value QT2 and for determining that the quality of the downlink 27 is not acceptable if the second filtered estimate Q22 is greater than the second quality threshold value QT2.

The evaluator units 63 and 67 are arranged to select the quality threshold values QT1 and QT2 depending on the character of the communications being performed over the channel 23. The threshold values QT1 and QT2 are consequently selected in one way for speech communications and in other ways for data communications. As is well understood by the skilled person, the way in which the threshold values QT1 and QT2 are preferably selected for speech communications depends on the type of communication system in which the system 59 is being used. If the system 59 is used in the D-AMPS system or similar, the threshold values QT1 and QT2 are preferably selected to correspond to bit error rates around 2%. If the system 59 is used in GSM or similar systems, the threshold values QT1 and QT2 are instead preferably selected to correspond to bit error rates around 5%. For data communications, such as "web-surfing" on the Internet and the like, the requirements on communication quality are normally less strict than the requirements for speech, and the quality threshold values QT1 and QT2 are thus selected less restrictively than for speech. For data communications requiring low or moderate communication quality, the threshold values are preferably selected to correspond to bit error rates around 10%. However, there are also data communications with higher requirements on communication quality, for example real time applications, voice over IP, streaming video et cetera. Consequently, for data communications having higher requirements on communication quality, the threshold values QT1 and QT2 are selected more restrictively than for data communications not having high requirements on communication quality.

The system 59 further comprises a first AND-gate 73, which is arranged for receiving the first bad quality indicator BQI1 and the first Rayleigh fading dip indicator RDI1. During communications over the uplink 25, as is well known to the skilled person, information is normally not transferred over the uplink 25 all the time. For data communications, information is usually not sent continuously over the uplink 25 but instead in bursts of relatively short durations. For speech communications, information is normally sent continuously over the uplink 25 (and the downlink 27). However, since a user of the first radio terminal T1 is normally not speaking all the time, some of the information sent over the uplink 25 is just speech code (or dummy frames) representing "silence", which of course is information of no practical value. If no information or only information of no practical value is sent over the uplink 25, then the communication quality of the uplink 25 is of no interest. In order to take this fact into account, the AND-gate 73 is arranged for receiving a first load indicator LI1 from the control part 19 of the first radio base station RBS1. The first load indicator LI1 is arranged to be one (1) if information is in fact sent over the uplink 25. The first load indicator LI1 is arranged to be zero (0) if no information or only information of no practical value is sent over the uplink 25. The first AND-gate 73 is arranged to generate a first binary signal b1 in dependence of the received indicators BQI1, RDI1 and LI1. The first binary signal b1 is one (1) if, at the same time, the first bad quality indicator BQI1 indicates that the communication quality of the uplink 25 is not acceptable, the first Rayleigh dip indicator RDI1 indicates that the uplink is subject to a Rayleigh fading dip and the first load indicator LI1 indicates that information is sent over the uplink 25. Otherwise, the first binary signal is zero (0). The first binary signal b1 indicates, by being one (1), that a handoff should be performed from the channel 23, since the communication quality of the uplink 25 is degraded due to Rayleigh fading and "valuable" information is in fact being sent over the uplink 25.

The system 59 further comprises a second AND-gate 75, which is arranged for receiving the second Rayleigh dip indicator RDI2 and the second bad quality indicator BQI2. The second AND-gate 75 is also arranged for receiving a second load indicator LI2 from the control part 19 of the first radio base station RBS1. The second load indicator LI2 is arranged to be one (1) if information is in fact sent over the downlink 27. The second load indicator LI2 is arranged to be zero (0) if no information or only information of no practical value is sent over the downlink 27. The second AND-gate 75 is arranged for generating a second binary signal b2. The second binary signal b2 is arranged to be one (1) if, at the same time, the second bad quality indicator BQI2 indicates that the communication quality of the downlink 27 is not acceptable, the second Rayleigh dip indicator RDI2 indicates that the downlink 27 is subject to a Rayleigh fading dip and the second load indicator LI2 indicates that information is sent over the downlink 27. Otherwise, the second binary signal b2 is arranged to be zero (0). The second binary signal b2 indicates, by being one (1), that a handoff should be performed from the channel 23, since the communication quality of the downlink 27 is degraded due to Rayleigh fading and "valuable" information is in fact being sent over the downlink 27.

The system 59 further comprises an OR-gate 77, which is arranged for receiving the first and the second binary signal b1 and b2 and for generating a handoff trigger signal HT in dependence of the first and the second binary signal b1 and b2. The handoff trigger signal HT is arranged to be one (1) if the first or the second binary signal b1 or b2 is one (1)—thereby indicating that a handoff should be performed from the channel 23. The handoff trigger signal HT is otherwise zero (0)—thereby indicating that no handoff is to be performed from the channel 23. Consequently, the handoff trigger signal HT indicates that a handoff is to be performed from the channel 23 if the communication quality of the uplink 25 is severely degraded due to Rayleigh fading and "valuable" information is in fact sent over the uplink 25, or if similar conditions apply to downlink 27.

In an alternative to the system 59 in FIG. 4, the load indicators LI1 and LI2 may be left out. This will make the system less efficient with regards to usage of communication resources. On the other hand, however, a somewhat simpler system is obtained.

The system 59 may, for example, be built with electrical components on one or more circuit boards and/or on one or more integrated circuit units. The skilled person will appreciate that the functions performed by the system 59 may also be performed with a computer being programmed with appropriate software and having suitable signal inputs and outputs, or with a computer in combination with additional hardware components.

The invention includes also a method, by which the system 59 operates, the method including method steps for carrying out the functions of the system 59, said method steps being readily apparent to a skilled person from the above.

If the handoff trigger signal HT indicates that a handoff is to be performed from the channel 23, a new channel is selected to which the handoff can be made. It is preferred to select the new channel for an intra-cell handoff.

Figure 5:
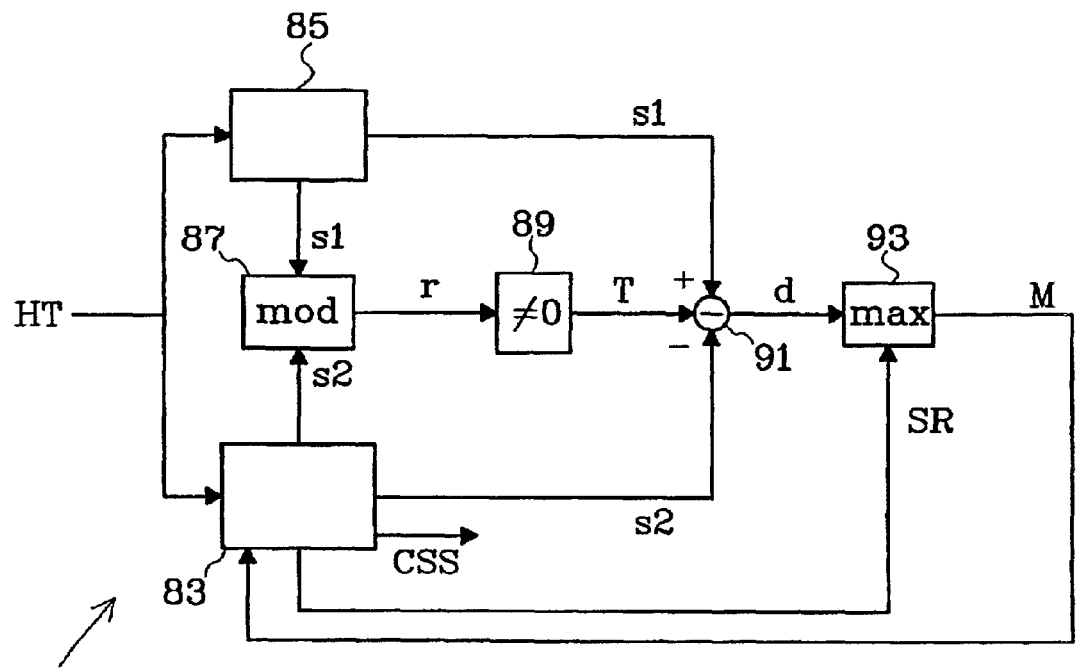
FIG. 5 is a block diagram describing a system for selecting a new channel to which handoff is to be performed from the channel associated with the first radio base station.

FIG. 5 is a block diagram describing a system 81 for selecting the new channel to which intra-cell handoff is to be performed from the channel 23. The system 81 is preferably arranged in the control part 19 of the first radio base station RBS1. Alternatively, however, the system 81 is arranged in some other part of the first radio base station RBS1 or at a location separate from the first radio base station RBS1.

The system 81 comprises a first unit 83, which is arranged for receiving the handoff trigger signal HT. The first unit 83 is arranged for determining a set of channels which are associated with the first radio base station RBS1 and which are available for intra-cell handoff responsive to the handoff trigger signal HT indicating that a handoff should be performed from the channel 23. In a preferred embodiment the set of channels includes all channels which are associated with the first radio base station RBS1 and which are available for intra-cell handoff. Alternatively, however, the set of channels may include fewer than all such channels. The system 81 comprises a second unit 85, which is also arranged for receiving the handoff trigger signal HT. Responsive to the handoff trigger signal HT indicating that a handoff should be performed, the second unit 85 is arranged for generating a first signal s1. The first signal s1 corresponds to the carrier frequency f1 of the uplink 25, in case the uplink is subject to a Rayleigh fading dip, and to the carrier frequency f2 of the downlink 27, in case the downlink 27 is subject to a Rayleigh fading dip.

The system 81 is arranged for selecting from the set of channels, the new channel to which intra-cell handoff from the channel 23 is to be performed, as will be explained in the following.

The first unit 83 is arranged for generating a second signal s2. If the uplink 25 is subject to a Rayleigh fading dip, the first unit 83 is arranged for generating the second signal s2 so that it corresponds, in sequence, to each one of the carrier frequencies of the uplinks of the channels in the set of channels. If, instead, the downlink 27 is subject to a Rayleigh fading dip, the first unit 83 is arranged for generating the second signal s2 so that it corresponds, in sequence, to each one of the carrier frequencies of the downlinks of the channels in the set of channels.

The system 81 further comprises a divider unit 87, which is connected to the first unit 83 and the second unit 85 and arranged for receiving the first signal s1 and the second signal s2. The divider unit 87 is arranged for generating a remainder r associated with a quotient between the carrier frequency indicated by the first signal s1 and the carrier frequency currently indicated by the second signal s2. The system 81 comprises a comparing unit 89, which is connected to the divider unit 87 and arranged for receiving the remainder r. The comparing unit 89 is arranged for generating a trigger indicator T if the received remainder r is not zero. The system 81 comprises a differentiator 91, which is connected to the first unit 83 and the second unit 85 and arranged for receiving the first signal s1 and the second signal s2. The differentiator 91 is also connected to the comparing unit 89. The differentiator 91 is arranged for generating a difference signal d in dependence of the first and the second signal s1 and s2 responsive to receiving the trigger indicator T from the comparing unit 89. The differentiator 91 is arranged for generating the difference signal d so that it corresponds to an absolute value of a difference between the carrier frequency indicated by the first signal s1 and the carrier frequency currently indicated by the second signal s2.

The system 81 further comprises a maximum unit 93, which is connected to the differentiator 91 and arranged for receiving the difference signal d. The maximum unit 93 is arranged for comparing the value that is currently being indicated by the difference signal d with a value which is stored in the maximum unit 93. If the value indicated by the difference signal d is greater than the previously stored value, the maximum unit 93 is arranged for replacing the stored value with the value indicated by the difference signal d. The maximum unit 93 is arranged for generating a maximum signal M, which corresponds to the value which is currently stored in the maximum unit 93. The maximum unit 93 is also arranged for receiving a start and reset signal SR from the first unit 83. The first unit 83 is arranged for generating the start and reset signal SR so that it indicates to the maximum unit 93 the start of the channel selection process. Upon receiving such a start indication, the maximum unit 93 is arranged to reset itself by setting the stored value to zero.

The first unit 83 is also connected to the maximum unit 93 and arranged for receiving the maximum signal M. The first unit 83 is arranged for registering the value indicated by the maximum signal M responsive to the first unit 83 having run through all uplink—or when applicable downlink—carrier frequencies associated with the channels in the set of channels.

If the uplink 25 is subject to a Rayleigh fading dip, then the value registered by the first unit 83 will provide an indication of the carrier frequency (or frequencies), among the carrier frequencies of the uplinks of the channels in the set of channels, which differs the most from the carrier frequency f1 of the uplink 25 without being an integer multiple of the carrier frequency f1 of the uplink 25. If, instead, the downlink 27 is subject to a Rayleigh fading dip, then the value registered by the first unit 83 will provide an indication of the carrier frequency (or frequencies), among the carrier frequencies of downlinks of the channels in the set of channels, which differs the most from the carrier frequency f2 of the downlink 27 without being an integer multiple of the carrier frequency f2 of the downlink 27. The first unit 83 is arranged for selecting, as the new channel, the channel in the set of channels which corresponds to the carrier frequency indicated by the registered value. The first unit 83 is also arranged for generating a channel selection signal CSS indicating the selected new channel. The control part 19 of the first radio base station RBS1 is arranged for receiving the channel selection signal CSS and for performing, in a manner well known to the skilled person, the necessary actions for an intra-cell handoff to take place from the channel 23 to the new channel indicated by the channel selection signal CSS.

In summary, the system 81 is arranged for determining the set of channels, which contains possible candidates to which intra-cell handoff can be performed from the channel 23. If the uplink 25 is subject to a Rayleigh fading dip, the system 81 is arranged for selecting, as the new channel, the channel in the set of channels which has an uplink carrier frequency which differs the most from the carrier frequency f1 of the uplink 25 without being an integer multiple of the carrier frequency f1 of the uplink 25. If, instead, the downlink 27 is subject to a Rayleigh fading dip, the system 81 is arranged for selecting, as the new channel, the channel in the set of channels which has a downlink carrier frequency which differs the most from the carrier frequency f2 of the downlink 27 without being an integer multiple of the carrier frequency f2 of the downlink 27.

The system 81 is arranged for selecting the new channel for intra-cell handoff. However, the invention is not limited to performing an intra-cell handoff, and the new channel may also be selected for an inter-cell handoff. For example, in the D-AMPS system channels from two separated frequency bands (the 900- and the 1900-band) are being employed. Each radio base station is associated with channels from one of the two bands. However, two radio base stations, having associated channels from different bands, often share the same site, i.e. the same geographical location. In such a situation, instead of performing an intra-cell handoff, an inter-cell handoff to a channel associated with the other radio base station sharing the same site may be contemplated. The system 81 can easily be modified in order to incorporate the "dual-band" inter-cell handoff considerations into the channel selection process. The first unit 83 is simply modified so that it incorporates into the set of channels also channels which are associated with a radio base station sharing the same site as the first radio base station RBS1 and which are available for inter-cell handoff.

The system 81 may, for example, be built with electrical components that are arranged on one or more circuit boards and/or one or more integrated circuit units. The skilled person will appreciate that the functions performed by the system 81 may also be performed with a computer being programmed with appropriate software and having suitable signal inputs and outputs, or with a computer in combination with additional hardware components.

The invention includes also a method, by which the system 81 operates, the method including method steps for carrying out the functions of the system 81, said method steps being readily apparent to a skilled person from the above.

The systems 39, 59 and 81 are in the examples disclosed and indicated above arranged for co-operation in functions relating to channel allocation in the PLMN 1, in order to provide countermeasures to the negative influences of Rayleigh fading. In such co-operation the systems 39, 59 and 81 may be arranged together or separately. The invention includes also a method, by which the systems 39, 59 and 81 co-operate, the method including method steps for carrying out the functions of the systems 39, 59 and 81, said method steps being readily apparent to a skilled person from the above.

In the examples disclosed and indicated above the systems 39, 59 and 81 are arranged for providing countermeasures against Rayleigh fading influencing the channel 23. Naturally, the PLMN 1 may include any number of further systems, similar to the systems 39, 59 and 81, for providing countermeasures against communication quality degradation due to Rayleigh fading with respect to a corresponding number of further channels. The further channels being associated with the first radio base station RBS1 and/or one or more of the other radio base stations RBS2-RBSN.

Although, in the examples disclosed and indicated above, the systems 39, 59 and 81 are arranged for co-operation in channel allocation, the skilled person will appreciate that the systems 39, 59 and 81 may also be used in combination or separately for performing their respective functions also for other purposes. For example, the system 39 may be used for determining whether uplinks or downlinks are subject to Rayleigh fading dips in any situation where such a determination is desirable.

Furthermore, the system 39 may be used in conjunction with the system 59 in order to generate a trigger signal, which corresponds to the handoff trigger signal HT but which is used instead for indicating that a countermeasure, other than handoff, is to be performed.

Figure 6:
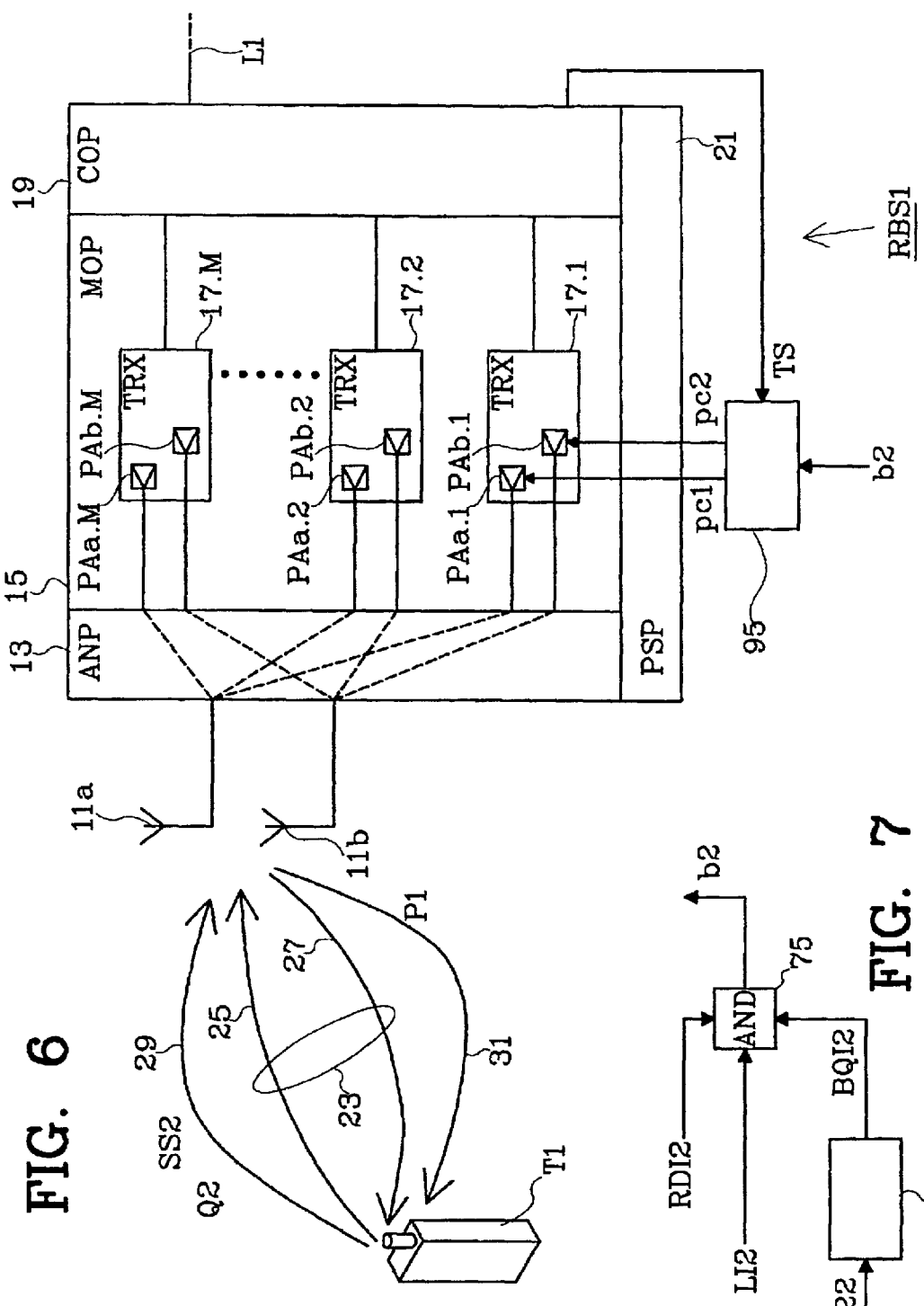
FIG. 6 is a block diagram describing the first radio terminal and the first radio base station, the first radio base station having a design which differs slightly from the design of the first radio base station as portrayed in FIG. 2.

FIG. 6 is a block diagram describing again the first radio terminal T1 and the first radio base station RBS1, the first radio base station RBS1 having in FIG. 6 an alternative design which differs slightly from the design of the first radio base station RBS1 as shown in FIG. 2. The first radio base station RBS1 in FIG. 6 includes a first and a second antenna 11*a* and 11*b*, which are used at least for radio transmissions from the first radio base station RBS1. The first and the second antenna 11*a* and 11*b* are arranged at different locations. The transceivers 17.1–17.M each include a first and a second controllable power amplifier PAa.1-PAa.M and PAb.1-PAb.M. The first power amplifier PAa.1-PAa.M of each transceiver 17.1–17.M is connected to the first antenna 11*a* via the antenna near part 13, and in a similar way the second power amplifier PAb.1-PAb.M of each transceiver 17.1–17.M is connected to the second antenna 11*b* via the antenna near part 13. An antenna control unit 95 is arranged for generating a first power control signal pc1 for controlling the first power amplifier PAa.1 of the first transceiver 17.1, which in this example is arranged for handling communications associated with the channel 23. The antenna control unit 95 is arranged for generating a second power control signal pc2 for controlling the second power amplifier PAb.1 of the first transceiver 17.1. In the example shown in FIG. 6, the access method used is TDMA, and the antenna control unit 95 is arranged for receiving from the control part 19 a timing signal TS indicating when time slots associated with channels which are handled by the first transceiver 17.1 are to be transmitted from the first radio base station RBS1. Alternatively, however, the antenna control unit 95 may receive the timing signal TS from, for example, the modem part 15 of the first radio base station RBS1. The antenna control unit 95 is also arranged for receiving the second binary signal b2 from the system 59. The antenna control unit 95 is arranged for controlling the power amplifiers PAa.1 and PAb.1 in dependence of the timing signal TS so that signals are transmitted over the downlink 27 of the channel 23 only from one of the antennas 11*a* or 11*b* at the time. In order to counteract the negative influences of Rayleigh fading on the downlink 27, the antenna control unit 95 is arranged for switching the transmitting antenna 11*a* (or 11*b*) when the second binary signal b2 is one (1), i.e. when the communication quality of the downlink 27 is degraded due to Rayleigh fading.

Figure 7:
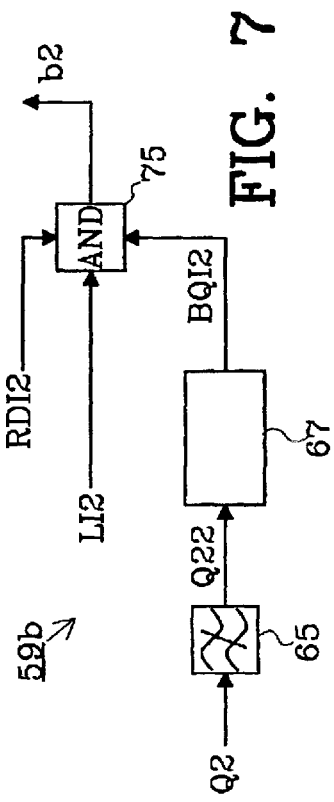
FIG. 7 is a block diagram describing a system including a selected number of features of the system in FIG. 4.

Since the antenna control unit 95 only receives the second binary signal b2, the whole of the system 59 is not needed for the operation of the antenna control unit 95. Instead, it should be pointed out that a simpler system 59*b*, as shown in FIG. 7, may be used. The system 59*b* includes only those features of the system 59 which are needed for generating the second binary signal b2. Consequently, the system 59*b* includes the second low-pass filter 65, the second evaluator unit 67 and the second AND-gate 75. However, as these features have been described thoroughly above when discussing the system 59, they will not be described again.

In the example in FIG. 6, the antennas 11*a* and 11*b* are, for reasons of clarity, switched only for the downlink 27 of the channel 23, which is in the example is handled by the first transceiver 17.1. However, the PLMN 1 may also include other systems, similar to the systems 59 or 59*b*, for generating other binary signals, similar to the second binary signal b2, indicating whether other channels handled by the first transceiver 17.1 have downlinks which have degraded communication quality due to Rayleigh fading. The antenna control unit 95 is then arranged for receiving these other signals and for controlling the power amplifiers PAa.1 and PAb.1 so that the transmitting antenna 11*a* (or 11*b*) is switched in an appropriate manner also for the downlinks of the these other channels handled by the first transceiver 17.1. Furthermore, the PLMN 1 may include any number of further systems, similar to the systems 59 or 59*b*, and corresponding antenna control units, similar to the antenna control unit 95, for providing similar antenna switching with respect to downlinks of any number of channels handled by the other transceivers 17.2–17.M.

For reasons of clarity, the antenna control unit 95 is drawn outside the first radio base station RBS1 in FIG. 6. However, in practice the antenna control unit 95 is preferably arranged in the modem part 15 of the first radio base station RBS1 or, alternatively, in the control part 19 of the first radio base station RBS1.

Figure 8:
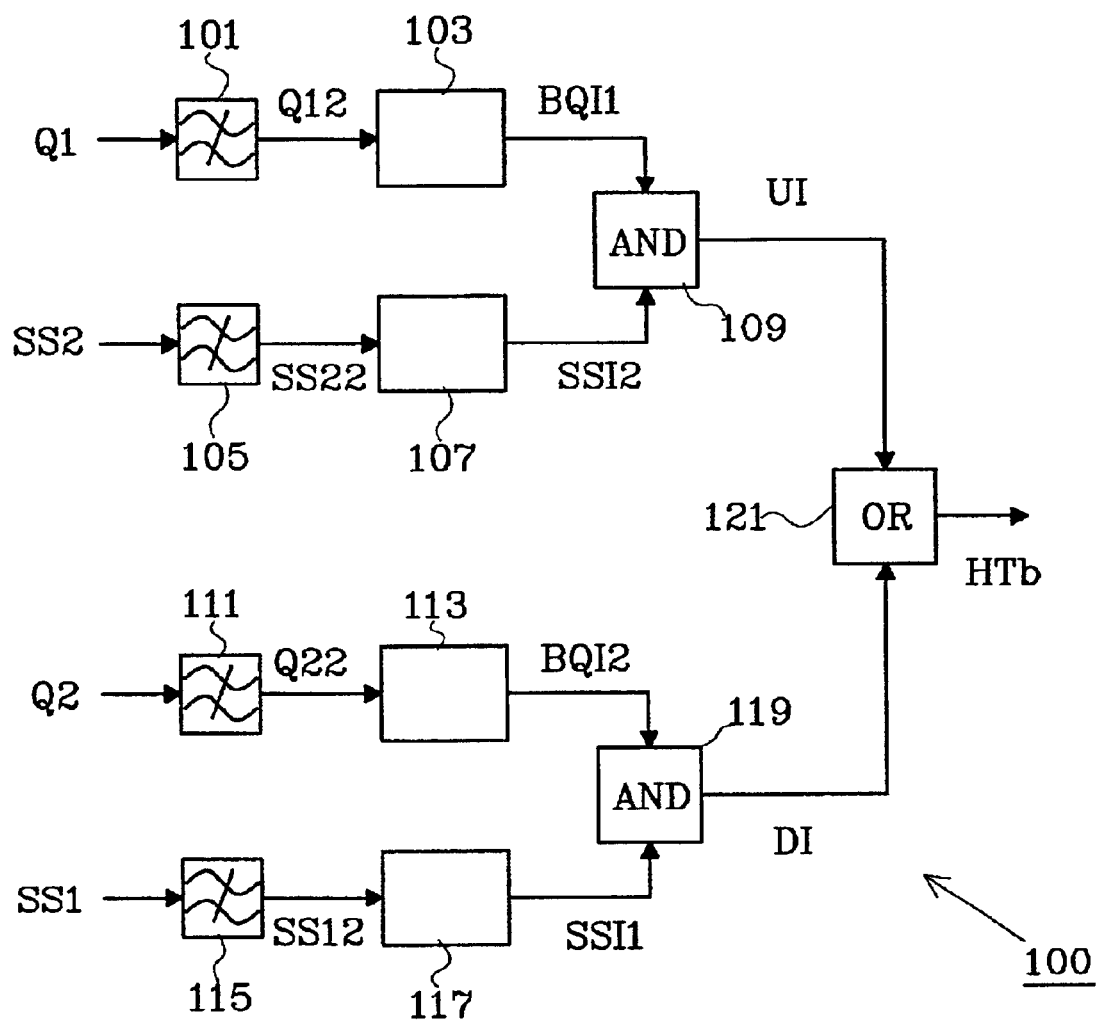
FIG. 8 is a block diagram describing a system for determining whether to perform a handoff from the channel associated with the first radio base station.

In FIG. 8 is shown a block diagram describing a system 100 for determining whether to perform an intra-cell handoff from the channel 23. The system 100 may be used as an alternative to the system 59. The system 100 is preferably located in the control part 19 of the first radio base station RBS1. Alternatively, however, the system 100 is located in some other part of the first radio base station RBS1 or at a location separate from the first radio base station RBS1.

The system 100 comprises a first low-pass filter 101 which is arranged for receiving the uplink communication quality estimate Q1. The first low-pass filter 101 is arranged for generating the first filtered estimate Q12 by low-pass filtering the estimate Q1. A first evaluator unit 103 is connected to the first low-pass filter 101 and arranged for receiving the low-pass filtered estimate Q12. The first evaluator unit 103 is arranged for determining in dependence of the filtered estimate Q12 whether or not the communication quality of the uplink 25 is acceptable and for generating the first bad quality indicator BQI1 indicating whether the communication quality of the uplink 25 is bad (not acceptable) or acceptable. The first evaluator unit 103 is arranged for determining that the communication quality of the uplink 25 is bad if the filtered estimate Q12 is greater than the first quality threshold value QT1. Otherwise, the first evaluator unit 103 is arranged for determining that the communication quality of the uplink 25 is acceptable. Consequently, the functions performed by the first low-pass filter 101 and the first evaluator unit 103 of the system 100 are in principal identical to the functions performed by the first low-pass filter 61 and the first evaluator unit 63 of the system 59.

The system 100 further comprises a second low-pass filter 105, which is arranged for receiving a measurement of the received downlink signal strength SS2 and for generating a filtered downlink signal strength SS22 by performing a low-pass filtering of the downlink signal strength SS2. A second evaluator unit 107 is connected to the second low-pass filter 105 and arranged for receiving the filtered downlink signal strength SS22. The second evaluator unit 107 is arranged for comparing the filtered downlink strength SS22 with a downlink signal strength threshold value SST2 indicating a level of downlink signal strength SS2 which is considered acceptable. The second evaluator unit 107 is arranged for generating a downlink signal strength indicator SSI2 indicating whether or not the downlink signal strength SS2 is acceptable.

The system 100 further comprises a first AND-gate 109 which is connected to the first and the second evaluator unit 103 and 107 and arranged for receiving the first bad quality indicator BQI1 and the downlink signal strength indicator SSI2. The first AND-gate 109 is arranged for generating an uplink indicator UI in dependence of the received indicators BQI1 and SSI2. The uplink indicator UI is arranged to be one (1) if, at the same time, the first bad quality indicator BQI1 indicates that the communication quality of the uplink 25 is not acceptable and the downlink signal strength indicator SSI2 indicates that the signal strength SS2 of the downlink 27 is acceptable. Otherwise, the uplink indicator UI is arranged to be zero (0). If the downlink signal strength SS2 is acceptable, it is not likely that the communication quality of the uplink 25 is degraded due to path loss or shading. Instead, it is much more likely that the communication quality of the uplink 25 is degraded due to a Rayleigh fading dip influencing the uplink 25. Consequently, by being one (1), the uplink indicator UI indicates that the communication quality of the uplink 25 is most likely degraded due to a Rayleigh fading dip and that a handoff should be performed from the channel 23.

The system 100 further comprises a third low-pass filter 111 which is arranged for receiving the downlink communication quality estimate Q2. The third low-pass filter 111 is arranged for generating the second filtered estimate Q22 by low-pass filtering the estimate Q2. A third evaluator unit 113 is connected to the third low-pass filter 111 and arranged for receiving the filtered estimate Q22. The third evaluator unit 113 is arranged for determining in dependence of the filtered estimate Q22 whether or not the communication quality of the downlink 27 is acceptable and for generating the second bad quality indicator BQI2 indicating whether the communication quality of the downlink 27 is bad (not acceptable) or acceptable. The third evaluator unit 113 is arranged for determining that the communication quality of the downlink 27 is bad if the filtered estimate Q22 is greater than the second quality threshold value QT2. Otherwise, the third evaluator unit 113 is arranged for determining that the communication quality of the downlink 27 is acceptable. Consequently, the functions performed by the third low-pass filter 111 and the third evaluator unit 113 of the system 100 are in principal identical to the functions performed by the second low-pass filter 65 and the second evaluator unit 67 of the system 59.

The system 100 further comprises a fourth low-pass filter 115, which is arranged for receiving a measurement of the received uplink signal strength SS1 and for generating a filtered uplink signal strength SS12 by performing a low-pass filtering of the uplink signal strength SS1. A fourth evaluator unit 117 is connected to the fourth low-pass filter 115 and arranged for receiving the filtered uplink signal strength SS12. The fourth evaluator unit 117 is arranged for comparing the filtered uplink signal strength SS12 with an uplink signal strength threshold value SST1 indicating a level of uplink signal strength SS1 which is considered acceptable. The fourth evaluator unit 117 is arranged for generating an uplink signal strength indicator SSI1 indicating whether or not the uplink signal strength SS1 is acceptable.

The system 100 further comprises a second AND-gate 119 which is connected to the third and the fourth evaluator unit 113 and 117 and arranged for receiving the second bad quality indicator BQI2 and the uplink signal strength indicator SSI1. The second AND-gate 119 is arranged for generating an downlink indicator DI in dependence of the received indicators BQI2 and SSI1. The downlink indicator DI is arranged to be one (1) if, at the same time, the second bad quality indicator BQI2 indicates that the communication quality of the downlink 27 is not acceptable and the uplink signal strength indicator SSI1 indicates that the signal strength SS1 of the uplink 25 is acceptable. Otherwise, the downlink indicator DI is arranged to be zero (0). If the uplink signal strength SS1 is acceptable, it is not likely that the communication quality of the downlink 27 is degraded due to path loss or shading. Instead, it is much more likely that the communication quality of the downlink 27 is degraded due to a Rayleigh fading dip influencing the downlink 27. Consequently, by being one (1), the downlink indicator DI indicates that the communication quality of the downlink 27 is most likely degraded due to a Rayleigh fading dip and that a handoff should be performed from the channel 23.

The system 100 further comprises an OR-gate 121 which is connected to the first and the second AND-gate 109 and 119. The OR-gate 121 is arranged for generating a handoff trigger signal HTb in dependence of the uplink indicator UI and the downlink indicator DI. The handoff trigger signal HTb is arranged to be one (1) if the uplink indicator UI or the downlink indicator DI is one (1)—thereby indicating that a handoff should be performed from the channel 23, since either the uplink 25 or the downlink 27 subject to a Rayleigh fading dip which degrades the communication quality of either link 25 or 27. Otherwise, the handoff trigger signal HTb is arranged to be zero (0).

The system 100 may, for example, be built with electrical components arranged on one or more circuit boards and/or on one or more integrated circuit units. The functions performed by the system 100 may also be performed with a computer being programmed with appropriate software and having suitable signal inputs and outputs, or by computer in combination with additional hardware components.

The invention includes also a method by which the system 100 operates, said method including steps for performing the functions of the system 100, said method steps being readily apparent to a skilled person from the above.

The system 81 may be used together with the system 100 for determining a new channel to which handoff (intra-cell or inter-cell) is to be performed from the channel 23 once it has been determined by the system 100 that a handoff is to take place.

Furthermore, the antenna control unit 95 in FIG. 6 may alternatively receive the downlink indicator DI from the system 100 (or from a system including only those features of the system 100 which are needed for the generation of the downlink indicator DI) instead of the second binary signal b2.

The invention may be used with most forms of radio telecommunication systems, such as D-AMPS, PDC (Pacific Digital Cellular), GSM, GPRS(EDGE), IS-95 et cetera. In particular, the invention may be used with radio telecommunication systems using channels in a plurality of separated frequency bands (e.g. dual band systems, such as GSM 900/1800, GSM 900/1900 (PCS), D-AMPS, IS-95 900/1900 et cetera).

What is claimed is:

1. A method for use in improving reliability and communication quality in a cellular radio communication system which includes at least a first radio base station having associated radio channels with uplinks and downlinks using different carrier frequencies, the method characterized by comprising:

determining whether one of a first uplink or a first downlink of a first radio channel is subject to a Rayleigh fading dip, the first radio channel being used during a current communication segment for communications between the first radio base station and a first radio terminal;

determining whether to execute a countermeasure in order to counteract the negative influences of Rayleigh fading, if it is determined that one of the first uplink or the first downlink is subject to a Rayleigh fading dip, wherein the determining of whether one of the first uplink or the first downlink is subject to a Rayleigh fading dip includes:

obtaining a gain of the first uplink;

obtaining a gain of the first downlink; and comparing the gain of the first uplink to the gain of the first downlink in order to deduce whether one of the first uplink or the first downlink is subject to a Rayleigh fading dip, wherein the comparing includes:

determining an offset associated with a difference between the gain of the first uplink and the gain of the first downlink during the current communication segment; and determining whether one of the first uplink or the first downlink is subject to a Rayleigh fading dip by monitoring how the difference between the gain of the first uplink and the gain the first downlink deviates from the offset.

2. A method according to claim 1, wherein the determining of the offset includes determining the offset by establishing an average value of the difference between the gain of the first uplink and the gain of the first downlink during the current communication segment.

3. A method according to claim 2, wherein the method further comprises:

generating an initiation value for use as a starting point when establishing the average value in order to reduce a convergence time of the establishing of the average value.

4. A method according to claim 3, wherein the generating of the initiation value includes generating the initiation value by averaging the difference between the gain of the first uplink and the gain of the first downlink during all communications performed over the first radio channel from a selected point in time which precedes the current communication segment.

5. A method according to claim 3, wherein the generating of the initiation value includes generating the initiation value by averaging the difference between the gain of the first uplink and the gain of the first downlink during communications performed over the first radio channel between the first radio base station and radio terminals of the same type as the first radio terminal.

6. A method according to any one of the claims 1 to 5, wherein the monitoring includes determining that the first downlink is subject to a Rayleigh fading dip, if the difference between the gain of the first uplink and the gain of the first downlink exceeds the offset by more than a first predetermined value.

7. A method according to claim 1, wherein the monitoring includes determining that the first uplink is subject to a Rayleigh fading dip, if the difference between the gain of the first uplink and the gain of the first downlink falls below the offset by more than a second predetermined value.

8. A method according to claim 1, wherein the determining of whether one of the first uplink or the first downlink is subject to a Rayleigh fading dip includes:

obtaining a quality estimate of the first uplink;

determining in dependence of the quality estimate of the first uplink whether the communication quality of the first uplink is acceptable;

obtaining a measurement of a first downlink signal strength received by the first radio terminal;

determining in dependence of the measured first downlink signal strength whether the first downlink signal strength is acceptable; and determining that the first uplink is subject to a Rayleigh fading dip, if the communication quality of the first uplink is not acceptable and the first downlink signal strength is acceptable.

9. A method according any one of claim 1 or 8, wherein the determining of whether one of the first uplink or the first downlink is subject to a Rayleigh fading dip includes:

obtaining a quality estimate of the first downlink;

determining in dependence of the quality estimate of the first downlink whether the communication quality of the first downlink is acceptable;

obtaining a measurement of a first uplink signal strength received by the first radio base station;

determining in dependence of the measured first uplink signal strength whether the first uplink signal strength is acceptable; and determining that the first downlink is subject to a Rayleigh fading dip, if the communication quality of the first downlink is not acceptable and the first uplink signal strength is acceptable.

10. A method according to claim 1, wherein the determining of whether to execute the countermeasure includes:

obtaining a quality estimate of the first uplink;

determining in dependence of the quality estimate of the first uplink whether a communication quality of the first uplink is acceptable; and determining to execute the countermeasure, if the first uplink is subject to a Rayleigh fading dip and the communication quality of the first uplink is not acceptable.

11. A method according to claim 1 wherein the determining of whether to execute the countermeasure includes:

obtaining a quality estimate of the first downlink;

determining in dependence of the quality estimate of the first downlink whether a communication quality of the first downlink is acceptable; and determining to execute the countermeasure, if the first downlink is subject to a Rayleigh fading dip and the communication quality of the first downlink is not acceptable.

12. A method according to claim 1, wherein the determining of whether to execute the countermeasure includes:

obtaining a quality estimate of the first uplink;

determining in dependence of the quality estimate of the first uplink whether a communication quality of the first uplink is acceptable;

determining when information is sent over the first uplink; and determining to execute the countermeasure, if information is sent over the first uplink while the first uplink is subject to a Rayleigh fading dip and the communication quality of the first uplink is not acceptable.

13. A method according to claim 1, wherein the determining of whether to execute the countermeasure includes:

obtaining a quality estimate of the first downlink;

determining in dependence of the quality estimate of the first downlink whether a communication quality of the first downlink is acceptable;

determining when information is sent over the first downlink; and determining to execute the countermeasure, if information is sent over the first downlink while the first downlink is subject to a Rayleigh fading dip and the communication quality of the first downlink is not acceptable.

14. A method according to claim 1, wherein the determining whether to execute the countermeasure includes determining to execute the countermeasure, if it is determined that the first uplink is subject to a Rayleigh fading dip.

15. A method according claim 1, wherein the determining whether to execute the countermeasure includes determining to execute the countermeasure, if it is determined that the first downlink is subject to a Rayleigh fading dip.

16. A method according to claim 15, wherein the determining whether to execute the countermeasure includes determining whether to perform a handoff from the first radio channel.

17. A method according claim 16, wherein the method further comprises:

selecting a new channel to which handoff is to be performed, if it is determined to perform a handoff from the first radio channel; and performing handoff from the first radio channel to the new channel.

18. A method according to claim 17, wherein the selecting includes:

determining a set of channels which are available for handoff; and selecting the new channel from the set of channels.

19. A method according to claim 18, wherein the determining of the set of channels includes determining the set of channels to include at least one channel associated with the first radio base station.

20. A method according to claim 18, wherein the cellular radio communication system includes at least a second radio base station having essentially the same location as the first radio base station, and wherein the determining of the set of channels includes determining the set of channels to include at least one channel associated with the second radio base station.

21. A method according to claim 18, wherein the selecting of the new channel from the set of channels includes, if the first uplink is subject to a Rayleigh fading dip, selecting from the set of channels the channel having an uplink using a carrier frequency which differs the most from the carrier frequency of the first uplink without being essentially an integer multiple of the carrier frequency of the first uplink.

22. A method according to claim 18, wherein the selecting of the new channel from the set of channels includes, if the first downlink is subject to a Rayleigh fading dip, selecting from the set of channels the channel having a downlink using a carrier frequency which differs the most from the carrier frequency of the first downlink without being essentially an integer multiple of the carrier frequency of the first downlink.

23. A method according to claim 1, wherein the determining of whether to execute the countermeasure includes determining whether to switch a transmitting antenna.

24. A method for determining whether one of a first uplink or first downlink of a first radio channel is subject to a Rayleigh fading dip, the first radio channel being used during a current communication segment for communications between a first radio base station and a first radio terminal, the method comprising:

obtaining a gain of the first uplink;

obtaining a gain of the first downlink; and comparing the gain of the first uplink to the gain of the first downlink in order to deduce whether one of the first uplink or the first downlink is subject to a Rayleigh fading dip, wherein the comparing includes:

determining an offset associated with a difference between the gain of the first uplink and the gain of the first downlink during the current communication segment; and determining whether one of the first uplink or the first downlink is subject to a Rayleigh fading dip by monitoring how the difference between the gain of the first uplink and the gain the first downlink deviates from the offset.

25. A method according to claim 24, wherein the determining of the offset includes determining the offset by establishing an average value of the difference between the gain of the first uplink and the gain of the first downlink during the current communication segment.

26. A method according to claim 25, wherein the method further comprises:

generating an initiation value for use as a starting point when establishing the average value in order to reduce a convergence time of the establishing of the average value.

27. A method according to claim 26, wherein the generating of the initiation value includes generating the initiation value by averaging the difference between the gain of the first uplink and the gain of the first downlink during all communications performed over the first radio channel from a selected point in time which precedes the current communication segment.

28. A method according to claim 26, wherein the generating of the initiation value includes generating the initiation value by averaging the difference between the gain of the first uplink and the gain of the first downlink during communications performed over the first radio channel between the first radio base station and radio terminals of the same type as the first radio terminal.

29. A method according to any one of claims 24 to 28, wherein the monitoring includes:

determining that the first downlink is subject to a Rayleigh fading dip, if the difference between the gain of the first uplink and the gain of the first downlink exceeds the offset by more than a first predetermined value; and determining that the first uplink is subject to a Rayleigh fading dip, if the difference between the gain of the first uplink and the gain of the first downlink falls below the offset by more than a second predetermined value.

30. An apparatus for use in improving reliability and communication quality in a cellular radio communication system which includes at least a first radio base station having associated radio channels with uplinks and downlinks using different carrier frequencies, the apparatus comprising:

means far determining whether one of a first uplink or a first downlink of a first radio channel is subject to a Rayleigh fading dip, the first radio channel being used during a current communication segment for communications between the first radio base station and a first radio terminal; and means for determining whether to execute a countermeasure in order to counteract the negative influences of Rayleigh fading, if it is determined that one of the first uplink or the first downlink is subject to a Rayleigh fading dip, wherein the means for determining of whether one of the first uplink or the first downlink is subject to a Rayleigh fading dip includes:

means for obtaining a gain of the first uplink;

means for obtaining a gain of the first downlink; and means for comparing the gain of the first uplink to the gain of the first downlink in order to deduce whether one of the first uplink or the first downlink is subject to a Rayleigh fading dip wherein the means for comparing includes:

means for determining an offset associated with a difference between the gain of the first uplink and the gain of the first downlink during the current communication segment; and means for monitoring how the difference between the gain of the first uplink and the gain the first downlink deviates from the offset.

31. An apparatus according to claim 30, wherein the means for determining the offset includes means for determining the offset by establishing an average value of the difference between the gain of the first uplink and the gain of the first downlink during the current communication segment.

32. An apparatus according to claim 31, wherein the apparatus further comprises:

means for generating an initiation value for use as a starting point when establishing the average value in order to reduce a convergence time of the establishing of the average value.

33. An apparatus according to claim 32, wherein the means for generating the initiation value includes means for generating the initiation value by averaging the difference between the gain of the first uplink and the gain of the first downlink during all communications performed over the first radio channel from a selected point in time which precedes the current communication segment.

34. An apparatus according to claim 32, wherein the means for generating the initiation value includes means for generating the initiation value by averaging the difference between the gain of the first uplink and the gain of the first downlink during communications performed over the first radio channel between the first radio base station and radio terminals of the same type as the first radio terminal.

35. An apparatus according to any one of the claims 30 to 34, wherein the means for monitoring includes means for determining that the first downlink is subject to a Rayleigh fading dip, if the difference between the gain of the first uplink and the gain of the first downlink exceeds the offset by more than a first predetermined value.

36. An apparatus according to claim 30, wherein the means for monitoring includes means for determining that the first uplink is subject to a Rayleigh fading dip, if the difference between the gain of the first uplink and the gain of the first downlink falls below the offset by more than a second predetermined value.

37. An Apparatus according to claim 30, wherein the means for determining whether one of the first uplink or the first downlink is subject to a Rayleigh fading dip includes:

means for obtaining a quality estimate of the first uplink, means for determining in dependence of the quality estimate of the first uplink whether the communication quality of the first uplink is acceptable;

means for obtaining a measurement of a first downlink signal strength received by the first radio terminal;

means for determining in dependence of the measured first downlink signal strength whether the first downlink signal strength is acceptable; and means for determining that the first uplink is subject to a Rayleigh fading dip, if the communication quality of the first uplink is not acceptable and the first downlink signal strength is acceptable.

38. An apparatus according any one of claim 30 or 37, wherein the means for determining whether one of the first uplink or the first downlink is subject to a Rayleigh fading dip includes:

means for obtaining a quality estimate of the first downlink;

means for determining in dependence of the quality estimate of the first downlink whether the communication quality of the first downlink is acceptable;

means for obtaining a measurement of a first uplink signal strength received by the first radio base station;

means for determining in dependence of the measured first uplink signal strength whether the first uplink signal strength is acceptable; and means for determining that the first downlink is subject to a Rayleigh fading dip, if the communication quality of the first downlink is not acceptable and the first uplink signal strength is acceptable.

39. An apparatus according claim 30, wherein the means for determining whether to execute the countermeasure includes:

means for obtaining a quality estimate of the first uplink;

means for determining in dependence of the quality estimate of the first uplink whether a communication quality of the first uplink is acceptable; and means for determining to execute the countermeasure, if the first uplink is subject to a Rayleigh fading dip and the communication quality of the first uplink is not acceptable.

40. A method according claim 30, wherein the means for determining of whether to execute the countermeasure includes:

means for obtaining a quality estimate of the first downlink;

means for determining in dependence of the quality estimate of the first downlink whether a communication quality of the first downlink is acceptable; and means for determining to execute the countermeasure, if the first downlink is subject to a Rayleigh fading dip and the communication quality of the first downlink is not acceptable.

41. An apparatus according to claim 30, wherein the means for determining whether to execute the countermeasure includes:
   means for obtaining a quality estimate of the first uplink;
   means for determining in dependence of the quality estimate of the first uplink whether a communication quality of the first uplink is acceptable;
   means for determining when information is sent over the first uplink; and
   means for determining to execute the countermeasure, if information is sent over the first uplink while the first uplink is subject to a Rayleigh fading dip and the communication quality of the first uplink is not acceptable.

42. An apparatus according to claim 30, wherein the means for determining whether to execute the countermeasure includes:
   means for obtaining a quality estimate of the first downlink;
   means for determining in dependence of the quality estimate of the first downlink whether a communication quality of the first downlink is acceptable;
   means for determining when information is sent over the first downlink; and
   means for determining to execute the countermeasure, if information is sent over the first downlink while the first downlink is subject to a Rayleigh fading dip and the communication quality of the first downlink is not acceptable.

43. An apparatus according to claim 30, wherein the means for determining whether to execute the countermeasure includes means for determining to execute the countermeasure, if it is determined that the first uplink is subject to a Rayleigh fading dip.

44. An apparatus according to claim 30, wherein the means for determining whether to execute the countermeasure includes means for determining to execute the countermeasure, if it is determined that the first downlink is subject to a Rayleigh fading dip.

45. An apparatus according to claim 30, wherein the means for determining whether to execute a countermeasure includes means for determining whether to perform a handoff from the first radio channel.

46. An apparatus according claim 45, wherein the apparatus further comprises:
   means for selecting a new channel to which handoff is to be performed, if it is determined to perform a handoff from the first radio channel; and
   means for initiating the handoff from the first radio channel to the new channel.

47. An apparatus according to claim 46, wherein the means for selecting includes:
   means for determining a set of channels which are available for handoff; and
   means for selecting the new channel from the set of channels.

48. An apparatus according to claim 47, wherein the means for determining the set of channels includes means for determining the set of channels to include at least one channel associated with the first radio base station.

49. An apparatus according to any one of the claim 47 or 48, wherein the cellular radio communication system includes at least a second radio base station having essentially the same location as the first radio base station, and wherein the means for determining the set of channels includes means for determining the set of channels to include at least one channel associated with the second radio base station.

50. An apparatus according to any one of the claim 47 or 48, wherein the means selecting the new channel from the set of channels includes means for selecting from the set of channels the channel having an uplink using a carrier frequency which differs the most from the carrier frequency of the first uplink without being essentially an integer multiple of the carrier frequency of the first uplink, if the first uplink is subject to a Rayleigh fading dip.

51. An apparatus according any one of the claim 47 or 48, wherein the means for selecting the new channel from the set of channels includes means for selecting from the set of channels the channel having a downlink using a carrier frequency which differs the most from the carrier frequency of the first downlink without being essentially an integer multiple of the carrier frequency of the first downlink, if the first downlink is subject to a Rayleigh fading dip.

52. An apparatus according to claim 30, wherein the means for determining whether to execute a countermeasure includes means for determining whether to switch a transmitting antenna.

53. An apparatus for determining whether one of a first uplink or first downlink of a first radio channel is subject to a Rayleigh fading dip, the first radio channel being used during a current communication segment for communications between a first radio base station and a first radio terminal, the apparatus comprising:
   means for obtaining a gain of the first uplink;
   means for obtaining a gain of the first downlink; and
   means for comparing the gain of the first uplink to the gain of the first down link in order to deduce whether one of the first uplink or the first downlink is subject to a Rayleigh fading dip, wherein the means for comparing includes:
   means for determining an offset associated with a difference between the gain of the first uplink and the gain of the first downlink during the current communication segment; and
   means for determining whether one of the first uplink or the first downlink is subject to a Rayleigh fading dip by monitoring how the difference between the gain of the first uplink and the gain the first downlink deviates from the offset.

54. An apparatus according to claim 53, wherein the means for determining the offset includes means for determining the offset by establishing an average value of the difference between the gain of the first uplink and the gain of the first downlink during the current communication segment.

55. An apparatus according to claim 54, wherein the apparatus further comprises:
   means for generating an initiation value for use as a starting point when establishing the average value in order to reduce a convergence time of the establishing of the average value.

56. An apparatus according to claim 55, wherein the means for generating of the initiation value includes means for generating the initiation value by averaging the difference between the gain of the first uplink and the gain of the first downlink during all communications performed over the first radio channel from a selected point in time which precedes the current communication segment.

57. An apparatus according to claim 55, wherein the means for generating of the initiation value includes means for generating the initiation value by averaging the difference between the gain of the first uplink and the gain of the first downlink during communications performed over the first radio channel between the first radio base station and radio terminals of the same type as the first radio terminal.

58. An apparatus according to any one of claims 53 to 57, wherein the means for monitoring includes:

means for determining that the first downlink is subject to a Rayleigh fading dip, if the difference between the gain of the first uplink and the gain of the first downlink exceeds the offset by more than a first predetermined value; and means for determining that the first uplink is subject to a Rayleigh fading dip, if the difference between the gain of the first uplink and the gain of the first downlink falls below the offset by more than a second predetermined value.

* * * * *

UNITED STATES PATENT AND TRADEMARK OFFICE
CERTIFICATE OF CORRECTION

PATENT NO.         : 6,826,410 B2
APPLICATION NO. : 09/749920
DATED                  : November 30, 2004
INVENTOR(S)       : Simonsson et al.

It is certified that error appears in the above-identified patent and that said Letters Patent is hereby corrected as shown below:

In Column 18, Line 12, in Claim 6, delete "any one of the claims 1 to 5" and insert -- claim 1 --, therefor.

In Column 18, Line 39, in Claim 9, after "according" insert -- to --.

In Column 18, Line 39, in Claim 9, delete "any one of the claim 1 or 8" and insert -- claim 1 --, therefor.

In Column 19, Line 37, in Claim 15, after "according" insert -- to --.

In Column 19, Line 41, in Claim 16, delete "15," and insert -- 1, --, therefor.

In Column 19, Line 45, in Claim 17, after "according" insert -- to --.

In Column 20, Line 64, in Claim 29, delete "any one of the claims 24 to 28" and insert -- claim 24 --, therefor.

In Column 21, Line 14, in Claim 30, delete "far" and insert -- for --, therefor.

In Column 21, Line 40, in Claim 30, after "gain" insert -- of --.

In Column 22, Lines 1-2, in Claim 35, delete "any one of the claims 30 to 34" and insert -- claim 30 --, therefor.

In Column 22, Line 13, in Claim 37, delete "Apparatus" and insert -- apparatus --, therefor.

In Column 22, Line 16, in Claim 37, delete "uplink," and insert -- uplink; --, therefor.

In Column 22, Line 29, in Claim 38, after "according" insert -- to --.

In Column 22, Line 29, in Claim 38, delete "any one of claim 30 or 37" and insert -- claim 30 --, therefor.

In Column 22, Line 47, in Claim 39, after "according" insert -- to --.

In Column 22, Line 58, in Claim 40, after "according" insert -- to --.

UNITED STATES PATENT AND TRADEMARK OFFICE
CERTIFICATE OF CORRECTION

PATENT NO. : 6,826,410 B2
APPLICATION NO. : 09/749920
DATED : November 30, 2004
INVENTOR(S) : Simonsson et al.

It is certified that error appears in the above-identified patent and that said Letters Patent is hereby corrected as shown below:

In Column 23, Line 46, in Claim 46, after "according" insert -- to --.

In Column 23, Line 63, in Claim 49, delete "any one of claim 47 or 48" and insert -- claim 47 --, therefor.

In Column 24, Line 4, in Claim 50, delete "any one of claim 47 or 48" and insert -- claim 47 --, therefor.

In Column 24, Line 12, in Claim 51, after "according" insert -- to --.

In Column 24, Line 12, in Claim 51, delete "any one of claim 47 or 48" and insert -- claim 47 --, therefor.

In Column 25, Line 6, in Claim 58, delete "any one of claims 53 to 57" and insert --claim 53 --, therefor.

Signed and Sealed this

Fifteenth Day of April, 2008

JON W. DUDAS
*Director of the United States Patent and Trademark Office*